(12) United States Patent
Jung et al.

(10) Patent No.: US 9,661,764 B2
(45) Date of Patent: May 23, 2017

(54) DISPLAY DEVICE

(71) Applicant: SAMSUNG ELECTRONICS CO., LTD., Suwon-si (KR)

(72) Inventors: Sung Soo Jung, Suwon-si (KR); Hyun Choul Kim, Hwaseong-si (KR); Woo Young Kan, Seongnam-si (KR); Doo Soon Park, Yongin-si (KR); Weon Hee Lee, Suwon-si (KR); Hyun Jun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 499 days.

(21) Appl. No.: 13/731,402

(22) Filed: Dec. 31, 2012

(65) Prior Publication Data

US 2013/0170156 A1 Jul. 4, 2013

(30) Foreign Application Priority Data

Dec. 30, 2011 (KR) .................. 10-2011-0147721
Dec. 30, 2011 (KR) .................. 10-2011-0147722
Jul. 13, 2012 (KR) .................. 10-2012-0076958

(51) Int. Cl.
*G06F 1/16* (2006.01)
*H05K 5/00* (2006.01)
(Continued)

(52) U.S. Cl.
CPC ..... *H05K 5/0017* (2013.01); *G02F 1/133308* (2013.01); *G06F 1/1601* (2013.01);
(Continued)

(58) Field of Classification Search
CPC ... G02F 1/133308; G02F 2001/133314; G02F 2001/133317; G02F 2001/13332; G06F 1/1601
(Continued)

(56) References Cited

U.S. PATENT DOCUMENTS 6,532,152 B1 * 3/2003 White et al. .................. 361/692
7,405,925 B2 * 7/2008 Sung .................. G02F 1/133308
345/905

(Continued)

FOREIGN PATENT DOCUMENTS

EP        1096537 A1    5/2001
JP        S 53-108720   8/1978
(Continued)

OTHER PUBLICATIONS

Communication dated Jul. 9, 2014 issued by European Patent Office in counterpart European application No. 12199596.3.
(Continued)

*Primary Examiner* — Binh Tran
(74) *Attorney, Agent, or Firm* — Sughrue Mion, PLLC (57) ABSTRACT

Disclosed herein is a display device having an intermediate panel firming supporting a display panel, maximizing heat dissipation and having a light weight, and a bracket facilitating assembly of the intermediate panel with other components. The display device includes the display panel, the intermediate panel disposed on the rear surface of the display panel, the bracket including a first combining part combined with the intermediate panel and a second combining part combined with the display panel and provided with guide grooves on the second combining part, a side cover including a frame part disposed at the edges of the display panel and the bracket, support parts extending from the frame part and supporting the bracket and a guide rib protruding in the forward direction of the support part and combined with the guide groove, and a rear cover disposed on the rear surface of the intermediate panel.

31 Claims, 10 Drawing Sheets

(51) Int. Cl.
*G02F 1/1333* (2006.01)
*H01L 51/52* (2006.01)
*H05K 7/00* (2006.01)

(52) U.S. Cl.
CPC .... *H01L 51/5237* (2013.01); *G02F 1/133385* (2013.01); *G02F 2001/133314* (2013.01)

(58) Field of Classification Search
USPC ............ 361/679.01, 679.02, 679.21, 679.22, 361/679.23, 679.24, 679.26, 679.3, 361/679.55, 679.56, 728; 349/58
See application file for complete search history.

(56) References Cited

U.S. PATENT DOCUMENTS

| | | | |
|---|---|---|---|
| 7,948,572 B2* | 5/2011 | Bae et al. ....................... | 349/58 |
| 2005/0286228 A1 | 12/2005 | Kim | |
| 2006/0132946 A1 | 6/2006 | Kim et al. | |
| 2008/0129918 A1* | 6/2008 | Kim et al. ..................... | 349/58 |
| 2009/0079894 A1* | 3/2009 | Okuda .............. | G02F 1/133308 349/58 |
| 2009/0207560 A1 | 8/2009 | Lee | |
| 2010/0147582 A1* | 6/2010 | Shin ................. | G02F 1/133308 174/535 |
| 2011/0090426 A1 | 4/2011 | Choi et al. | |
| 2011/0260959 A1* | 10/2011 | Son .................. | G02F 1/133308 345/102 |
| 2011/0315317 A1 | 12/2011 | Ling et al. | |

FOREIGN PATENT DOCUMENTS

| | | |
|---|---|---|
| JP | 11329253 A | 11/1999 |
| JP | 2000347212 A | 12/2000 |
| JP | 2001134195 A | 5/2001 |
| JP | 200524961 A | 1/2005 |
| JP | 2006171696 A | 6/2006 |
| JP | 2006171763 A | 6/2006 |
| JP | 2006215548 A | 8/2006 |
| JP | 2008276035 A | 11/2008 |
| JP | 2009128898 A | 6/2009 |
| JP | 2011164442 A | 8/2011 |
| KR | 100277630 B1 | 10/2000 |
| KR | 1020060065237 A | 6/2006 |

OTHER PUBLICATIONS

International Search Report dated Apr. 22, 2013 from the International Searching Authority in counterpart application No. PCT/KR/2012/011703.
Communication dated Nov. 1, 2016, issued by the Japanese Intellectual Property Office in counterpart Japanese Application No. 2012-289026.
Communication dated Jan. 3, 2017, issued by the State Intellectual Property Office of P.R. China in counterpart Chinese Application No. 201210587613.0.

* cited by examiner

DISPLAY DEVICE

CROSS-REFERENCE TO RELATED APPLICATIONS

This application claims the benefit of Korean Patent Application No. 2011-0147721, filed on Dec. 30, 2011, No. 2011-0147722, filed on Dec. 30, 2011, and No. 2012-0076958, filed on Jul. 13, 2012, in the Korean Intellectual Property Office, the disclosure of which is incorporated herein by reference.

BACKGROUND

1. Field

Exemplary embodiments relate to a display device which has light weight and minimizes concentration of heat at a specific region.

2. Description of the Related Art

Display devices are devices to display an image on a screen, and generally correspond to TVs, computer monitors, etc.

Recently, in order to satisfy demand for slimness, lightweight and low-power consumption, flat panel display devices, as replacements for cathode-ray tube display devices, have been developed.

Flat panel display devices may be generally classified into a light emitting type and a light receiving type. Light emitting type flat panel display devices include a plasma display panel (PDP) and an organic light emitting diode (OLED). Light receiving type flat panel display devices include a liquid crystal display (LCD).

Among these, a display device using OLEDs has excellent brightness and viewing angle characteristics and does not require a backlight unit, as compared to a liquid crystal display, thus having an ultra thin structure.

SUMMARY

Therefore, it is an aspect of the exemplary embodiments to provide a display device having an intermediate panel which firmly supports a display panel, maximizes heat dissipation and has a light weight.

It is another aspect of the exemplary embodiments to provide a display device having an intermediate panel which executes an insulating function.

It is a further aspect of the exemplary embodiments to provide a display device having a bracket which facilitates assembly of an intermediate panel with other components.

Additional aspects of the exemplary embodiments will be set forth in part in the description which follows.

In accordance with one aspect of the exemplary embodiments, a display device includes a display panel, an intermediate panel disposed on the rear surface of the display panel and preventing deformation and breakage of the display panel, a bracket including a first combining part combined with the intermediate panel and a second combining part protruding in the forward, i.e., frontal, direction of the first combining part and combined with the display panel, and provided with guide grooves on the rear surface of the second combining part, a side cover including a frame part disposed at the edges of the display panel and the bracket to form the external appearance of the side surface of the display device, support parts extending from the frame part and supporting the bracket, and a guide rib protruding in the forward, i.e., frontal, direction of the support part and combined with the guide groove, and a rear cover disposed on the rear surface of the intermediate panel and forming the external appearance of the rear surface of the display device.

The intermediate panel may be attached to the rear surface of the display panel through an adhesive element.

The first combing part of the bracket may be attached to the rear surface of the intermediate panel through an adhesive element.

The second combining part of the bracket may be attached to the rear surface of the display panel through an adhesive element.

The second combining part of the bracket may be provided to have the same shape as the edge of the display panel or to protrude more outward than the edge of the display panel, in order to protect the edge of the display panel.

The display device may further include a flexible printed circuit film connected to the display panel to supply a driving signal to the display panel.

The bracket may further include first penetration parts formed by opening parts of the lower portion of the bracket so as to extend the flexible printed circuit film connected to the display panel in the backward, i.e., the rearward, direction of the bracket.

The support parts of the side cover may include a first support part provided at the lower end of the side cover and a second support part provided at the upper end of the side cover.

The guide rib may be provided on the first support part.

Plural guide protrusions combined with the guide groove of the bracket may be provided on the second support part, and the plural guide protrusions may be separated from each other so as to form second penetration parts at positions corresponding to the first penetration parts of the bracket.

The front surface region of the frame part of the side cover may cover the side surface of the display panel so as not to expose the side surface of the display panel, and the rear surface region of the frame part may cover the side surface of the rear cover so as not to expose the side surface of the rear cover.

The frame part of the side cover may be provided to completely expose the front surface of the display panel.

A plurality of first coupling holes may be provided on the second combining part of the bracket, and a plurality of second coupling holes may be provided on the support parts of the side cover at positions corresponding to the plurality of first coupling holes so that the bracket and the side cover may be combined by coupling members.

A plurality of third coupling holes may be provided on the rear cover at positions corresponding to the plurality of first coupling holes and the plurality of second coupling holes so that the rear cover may be combined with the bracket by coupling members.

The intermediate panel may include an inner part including spaces filled with air and at least one outer part mounted on at least one of the front and rear surfaces of the inner part.

The inner part may include a plurality of cells formed through the inner part. Each of the plurality of cells may have a hexagonal shape.

The inner part may have a honeycomb structure. The inner part may have a wave-shaped corrugated structure.

The inner part may be formed of aluminum. The at least one outer part may be formed of aluminum.

At least one of the inner part and the at least one outer part may include an insulator.

The insulator may include plastic or a non-woven fabric.

In accordance with another aspect of the exemplary embodiments, a display device includes a display panel, an intermediate panel disposed on the rear surface of the display panel and preventing deformation and breakage of the display panel, a bracket combined with the edge of the intermediate panel and provided with first penetration parts through which a flexible printed circuit film connecting the display panel to a source printed circuit board supplying a driving signal to the display panel passes, formed at the lower portion thereof, a side cover combined with the edge of the bracket, forming the external appearance of the side surface of the display device, and provided with second penetration parts through which the flexible printed circuit film passes, formed at positions corresponding to the first penetration parts, and a rear cover disposed on the rear surface of the intermediate panel and preventing exposure of the source printed circuit board to the outside.

A holder to fix a power substrate supplying power to the display panel and a main substrate transmitting a signal may be provided on the intermediate panel.

The intermediate panel may include an inner part including spaces filled with air and at least one outer part mounted on at least one of the front and rear surfaces of the inner part.

The inner part may have one of a honeycomb structure and a wave-shaped corrugated structure.

The bracket may include a first combining part combined with the intermediate panel and a second combining part protruding in the forward, i.e., frontal, direction of the first combining part and combined with the display panel, and be provided with guide grooves on the rear surface of the second combining part.

The second combining part of the bracket may be provided to have the same shape as the edge of the display panel or to protrude more outward than the edge of the display panel, in order to protect the edge of the display panel.

The side cover may include a frame part disposed at the edges of the display panel and the bracket to form the external appearance of the side surface of the display device, and support parts extending from the frame part and supporting the bracket.

The frame part of the side cover may be provided to completely expose the front surface of the display panel, the front surface region of the frame part of the side cover may cover the side surface of the display panel so as not to expose the side surface of the display panel, and the rear surface region of the frame part may cover the side surface of the rear cover so as not to expose the side surface of the rear cover.

The side cover may further include a guide rib protruding in the forward, i.e., frontal, direction of the support part and combined with the guide groove.

The side cover may further include plural guide protrusions protruding in the forward, i.e., frontal, direction of the support part and combined with the guide groove, and the plural guide protrusions may be separated from each other so as to form the second penetration parts at positions corresponding to the first penetration parts of the bracket.

In an exemplary embodiment of the invention, there is a display device including: a display panel disposed at a front of the display device; an intermediate panel disposed on a rear surface of the display panel, the intermediate panel having a rigidity that is greater than a rigidity of the display panel; a bracket including a first combining part which is attached to the intermediate panel and a second combining part which protrudes toward a frontal direction from the first combining part and attaches to the display panel, and guide grooves disposed on a rear surface of the second combining part; a side cover including a frame part disposed at edges of the display panel and the bracket to form an external appearance of a side surface of the display device, support parts extending from the frame part and supporting the bracket, and a guide rib protruding in the frontal direction from the support parts, which are received in one of the guide grooves; and a rear cover disposed on a rear surface of the intermediate panel and disposed at a rear of the display panel, the rear cover forming an external appearance of the rear surface of the display device.

In yet another exemplary embodiment, there is a display device including: a display panel; an intermediate panel disposed on a rear surface of the display panel, the intermediate panel having a rigidity that is greater than a rigidity of the display panel; a bracket attached to an edge of the intermediate panel, the bracket including first penetration parts through which a flexible printed circuit film connecting the display panel to a source printed circuit board supplying a driving signal to the display panel, passes, formed at the lower portion thereof; a side cover attached to the edge of the bracket, forming the external appearance of the side surface of the display device, and provided with second penetration parts through which the flexible printed circuit film passes, formed at positions corresponding to the first penetration parts; and a rear cover disposed on the rear surface of the intermediate panel and preventing exposure of the source printed circuit board to an outside of the display device.

BRIEF DESCRIPTION OF THE DRAWINGS

These and/or other aspects of the exemplary embodiments will become apparent and more readily appreciated from the following description, taken in conjunction with the accompanying drawings of which.

DETAILED DESCRIPTION

Reference will now be made in detail with exemplary embodiments, examples of which are illustrated in the accompanying drawings, wherein like reference numerals refer to like elements throughout.

Figure 1:
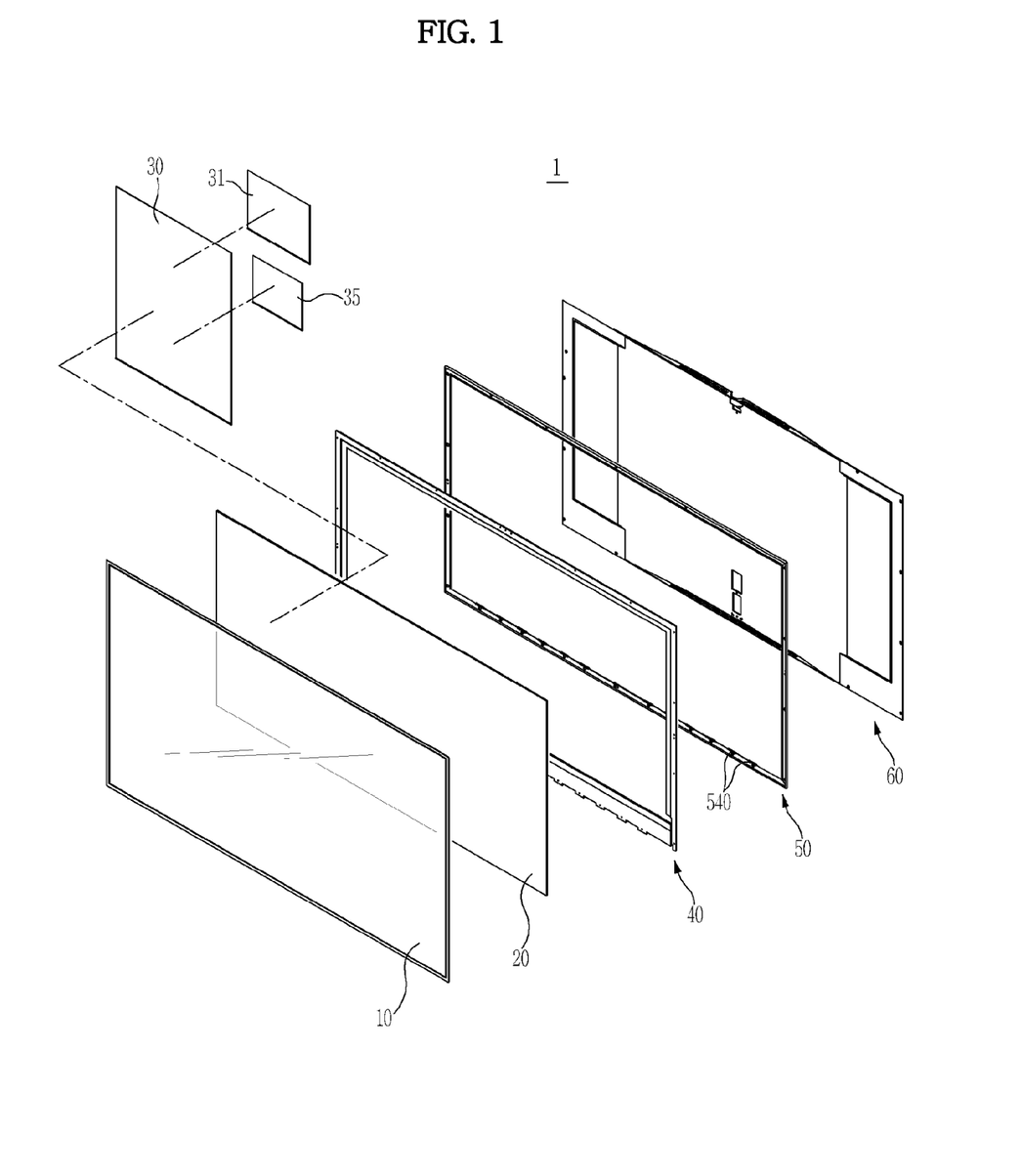
FIG. 1 is an exploded perspective view illustrating the configuration of a display device in accordance with one embodiment of the exemplary embodiments.

As shown in FIG. 1, a display device 1 is disposed such that a display panel 10 is exposed through the front surface of the display device 1. A rear cover 60 forming the external appearance of the rear portion of the display device 1 may be provided at the rear of the display panel 10.

Although one embodiment of the exemplary embodiments illustrates an organic light emission diode panel as the display panel 10, the display panel 10 may be a liquid crystal display panel in addition to the organic light emission diode panel.

The display panel 10 is divided into an active area in which an image is displayed, and an inactive area in which an image is not displayed.

In the active area, a plurality of thin film transistors (not shown) is formed on a glass substrate, a liquid crystal layer or an organic layer to form pixels is formed on the thin film transistors, and an image is displayed through on/off control of the thin film transistors.

Figure 8:
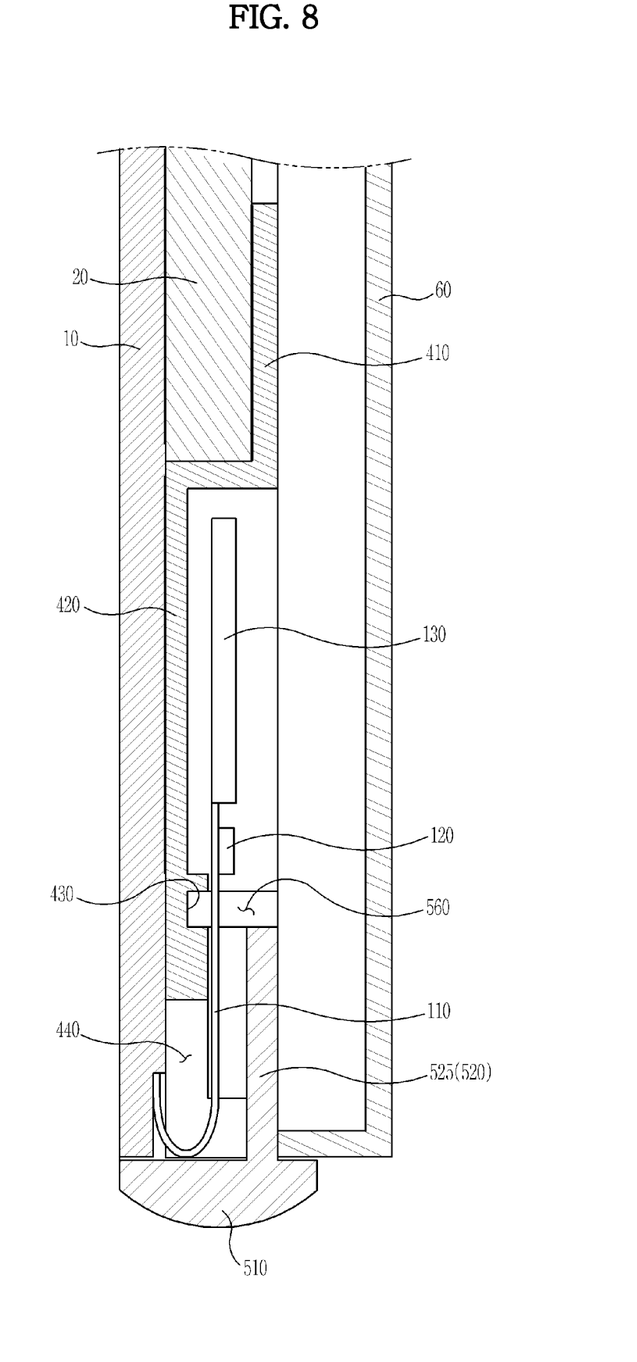
FIGS. 8 and 9 are cross-sectional views of a lower portion of the display device in accordance with an exemplary embodiment of the exemplary embodiments.
Figure 9:
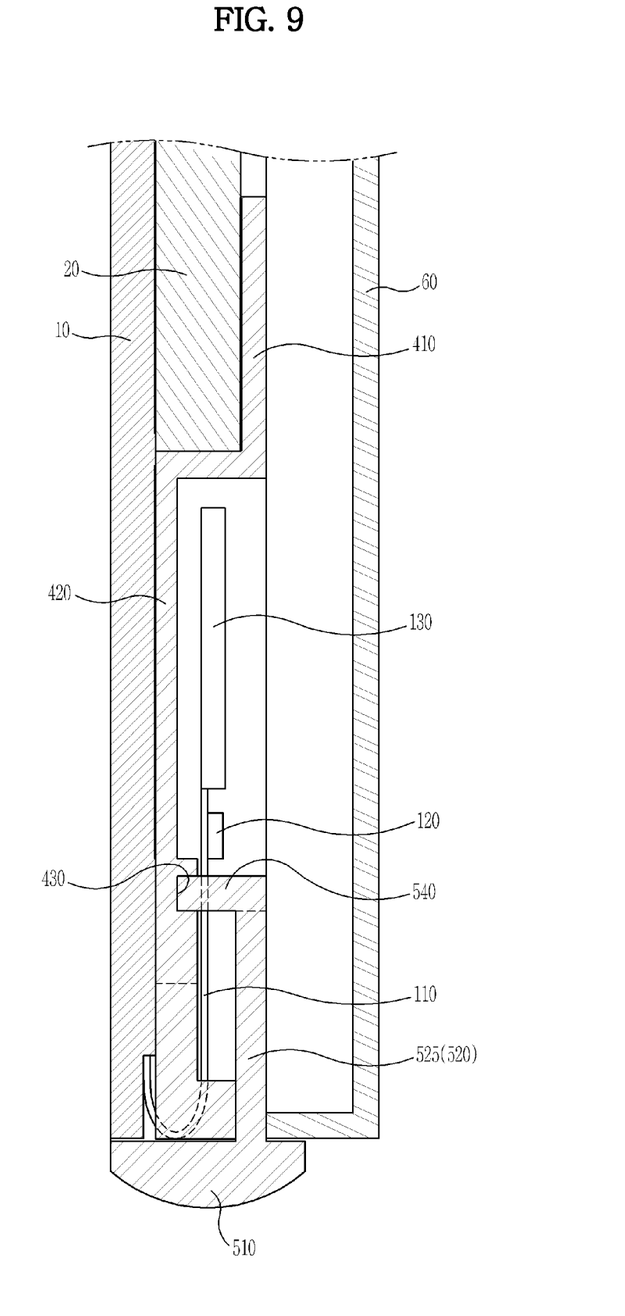

A flexible printed circuit film 110 may be provided at the rear of the display panel 10, as shown in FIGS. 8 and 9. The flexible printed circuit film 110 may be a chip-on-film (COF) type in which a chip device is mounted on a base film. A chip 120 is mounted at the central portion of the flexible printed circuit film 110, and a source printed circuit board 130 is mounted at the end of the flexible printed circuit film 110.

Figure 10:
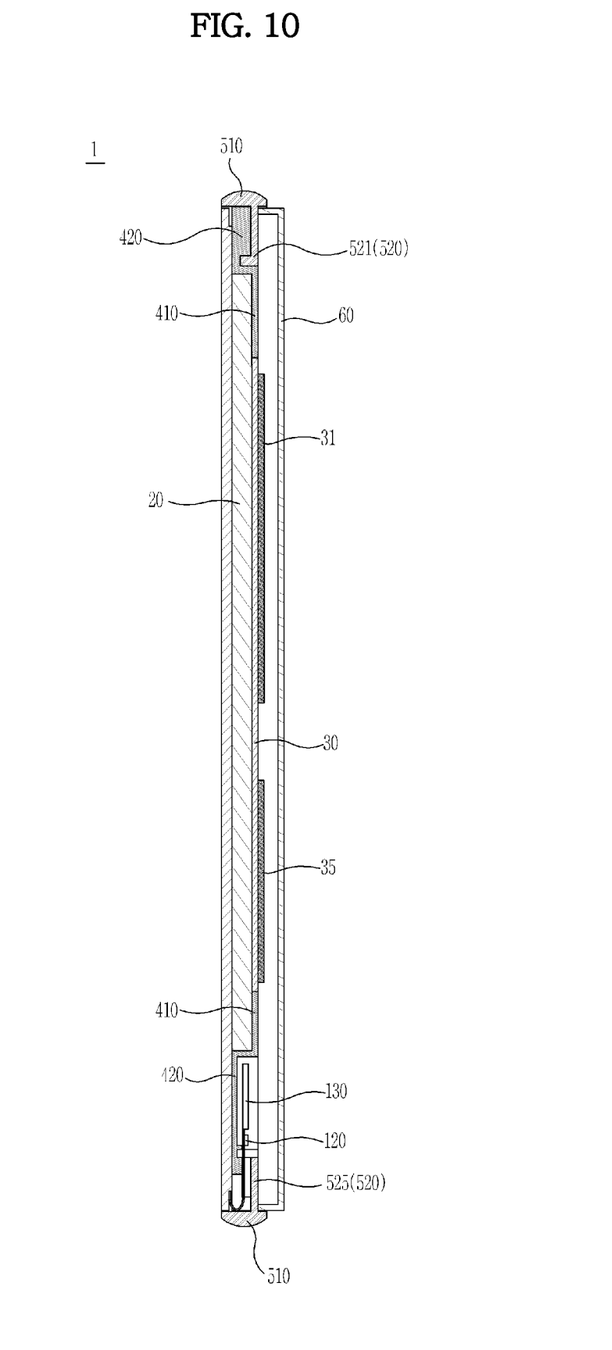
FIG. 10 is a cross-sectional view of the display device in accordance with an exemplary embodiment of the exemplary embodiments.

As shown in FIGS. 1 and 10, an intermediate panel 20 may be provided between the display panel 10 and the rear cover 60.

The intermediate panel 20 is attached to the rear surface of the display panel 10 through an adhesive element. The adhesive element may be a double-sided tape or an adhesive. According to an exemplary embodiment, the intermediate panel 20 may not be directly attached to the display panel 10, and may be attached to a bracket 40 which will be described later, and then combined with the display panel 10.

A holder 30 on which a main substrate 35 and a power substrate 31 are seated is combined with the rear portion of the intermediate panel 20. The power substrate 31 connects the display device 1 to an external power supply, and includes a switched mode power supply (SMPS). The main substrate 35 generates an image signal displayed on the display panel 10.

In addition, a signal transmission substrate (not shown) transmitting the image signal generated by the main substrate 35 to the display panel 10 may be mounted on the holder 30.

Figure 2:
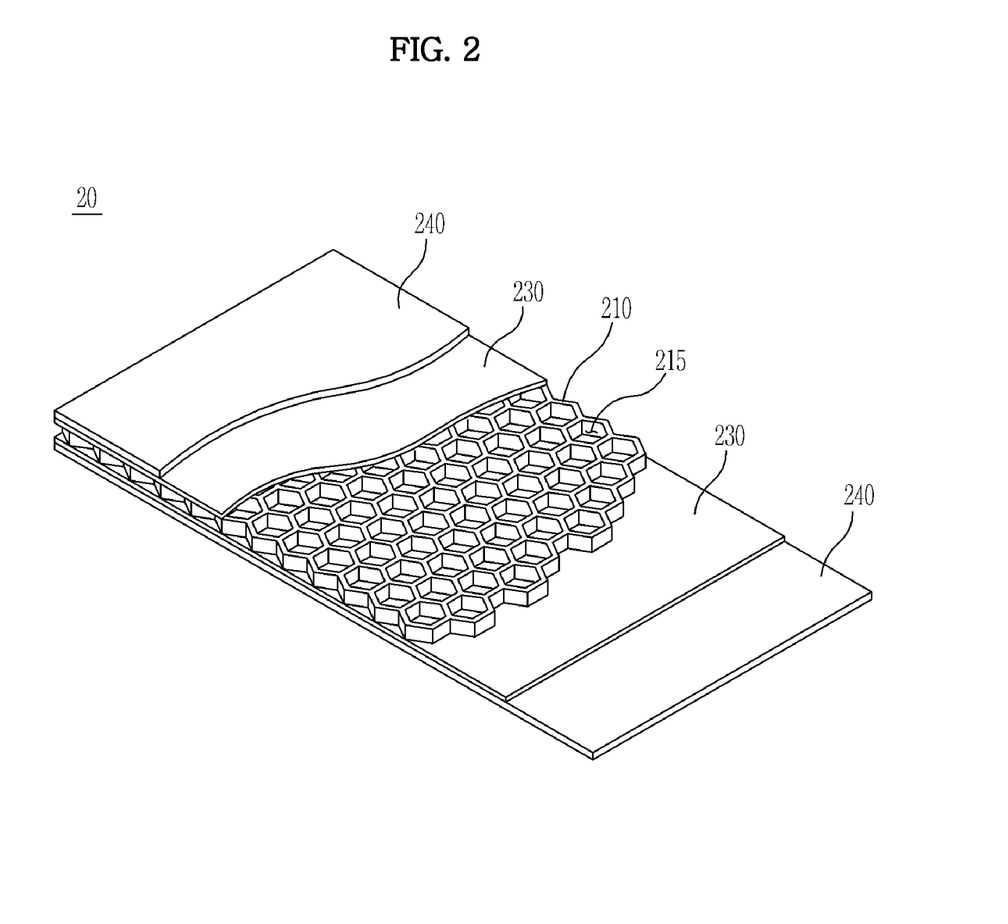
FIG. 2 is a view illustrating the internal configuration of an intermediate panel in accordance with one embodiment of the exemplary embodiments.

As shown in FIG. 2, the intermediate panel 20 includes an inner part 210 and outer parts 240. The outer parts 240 may include two outer parts 240 disposed at a designated interval.

The inner part 210 may include a plurality of cells 215 formed through the inner part 210. The cells 215 have the shape of a hole formed through the inner part 210.

In this exemplary embodiment, the cells 215 have a hexagonal shape. Such a structure including the cells 215 of hexagonal shape is referred to as a honeycomb structure. The honeycomb structure has a light weight due to the cells 215 formed therein. The cells 215 are filled with air, and thus the honeycomb structure is light when compared with the overall size thereof. Further, the honeycomb structure has sufficient rigidity by means of the combined structure of the cells 215.

Although this exemplary embodiment illustrates the cells 215 to have the honeycomb structure, the cells 215 may have a polygonal shape or a circular shape as long as the cells 215 may be filled with air.

The intermediate panel 20 including the above-described inner part 210 is mounted on the rear surface of the thin display panel 10, and prevents breakage and deformation of the display device 1. In an exemplary embodiment, the intermediate panel 20 has a rigidity that is greater than a rigidity of the display panel 10.

The outer parts 240 including an aluminum sheet are mounted on the outer surface of the inner part 210. Since the inner part 210 of the intermediate panel 20 does not easily attach to the bracket 40 and the display panel 10, the outer parts 240 may be provided. Further, the outer parts 240 are formed of aluminum, and thus have high thermal conductivity.

Although this exemplary embodiment illustrates the outer parts 240 as mounted on both surfaces of the inner part 210, the outer part 240 may be mounted only one on one surface or side of the inner part 210.

In order to combine the inner part 210 and the outer part 240, a separate adhesion sheet 230 may be provided between the inner part 210 and the outer part 240. However, the inner part 210 and the outer part 240 may be combined by other units or other means in addition to the adhesion sheet 230.

The intermediate panel 20 may have light weight and serve both to reinforce the display panel 10 and to minimize concentration of heat generated from the display panel 10 at a specific region.

The inner part 210 and the outer parts 240 may be formed of a material having high thermal conductivity, and transmit heat to the entirety of the display device 1 without concentration of heat at a specific region of the display panel 10. The display panel 10 is sensitive to heat, and thus when excessive heat is applied to the display panel 10, lowering of the function of the display panel 10, such as lowering of color characteristics, may result. Particularly, since the main substrate 35 and the power substrate 31 disposed at the rear of the display panel 10 generate a large amount of heat, the intermediate panel 20 exhibits a function of conducting heat to the entirety of the display device 1.

The inner part 210 may include an aluminum plate. However, if the inner part 210 is formed of plastic, the intermediate panel 20 may additionally have an insulating function. As described above, the holder 30 on which the main substrate 35 (with reference to FIG. 1) and the power substrate 31 (with reference to FIG. 1) are mounted is installed at the rear of the intermediate panel 20. An insulating plate (not shown) for insulation may be interposed between the holder 30 and the intermediate panel 20.

However, if the inner part 210 of the intermediate panel 20 is formed of an insulating material, such as plastic, the insulating plate may be omitted. In this case, the intermediate panel 20 itself may serve as the insulating plate.

In general, the outer part 240 may include an aluminum sheet. However, although the inner part 210 is not formed of an insulating material, when the outer parts 240 attached to the outer surface of the inner part 210 are formed of an insulating material, the outer parts 240 may exhibit the same effect. Therefore, in this case, the outer parts 240 may be formed of an insulating material, such as a nonwoven fabric.

That is, if both the inner part 210 and the outer parts 240 are formed of an insulating material or if one of the inner part 210 and the outer parts 240 is formed of an insulating material, the above-described effect may be achieved.

Figure 3:
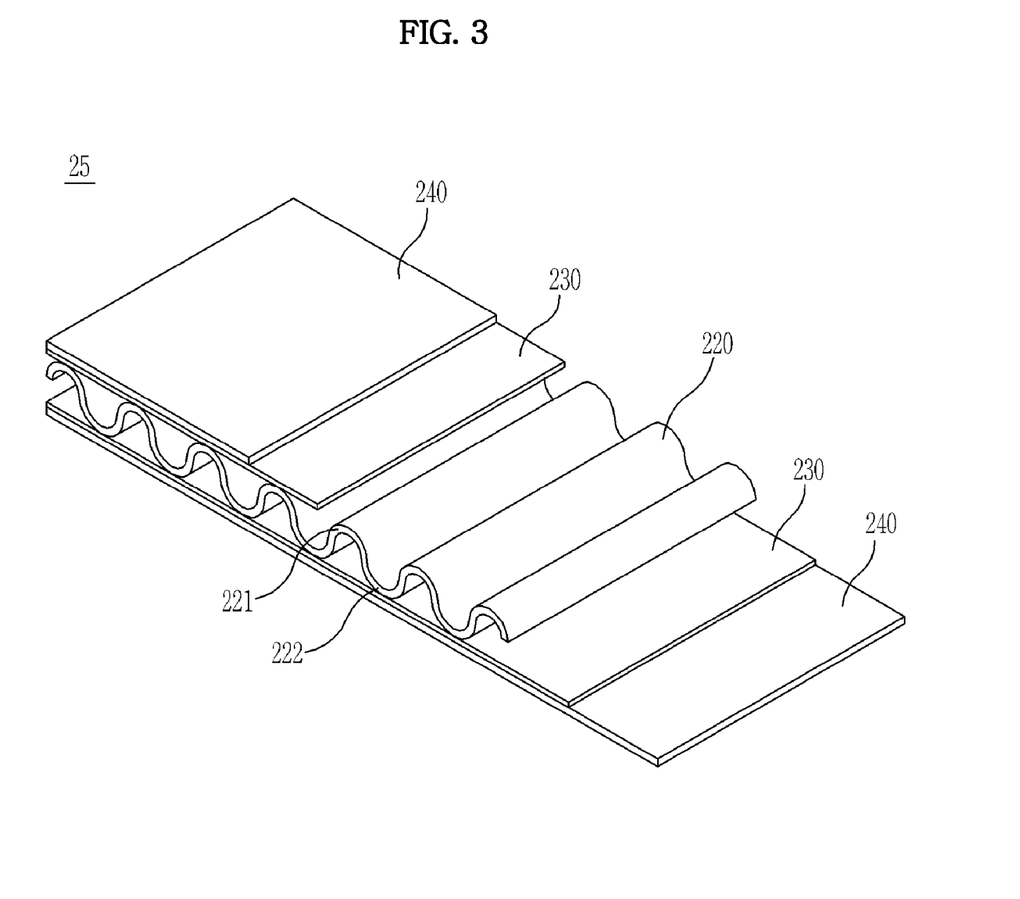
FIG. 3 is a view illustrating the internal configuration of an intermediate panel in accordance with another embodiment of the exemplary embodiments.

FIG. 3 illustrates an intermediate panel 25 including an inner part 220 in accordance with another exemplary embodiment differing from the exemplary embodiment of FIG. 2.

The intermediate panel 25 includes an inner part 220 and outer parts 240. The outer parts 240 may include two outer parts 240 disposed at a designated interval.

The outer parts 240 are attached to the outer surface of the inner part 220. This is to facilitate attachment of the intermediate panel 25 with other components.

The inner part 220 may have a wave-shaped corrugated structure. That is, the inner part 220 may have a shape in which ribs 221 and grooves 222 are alternately repeated.

A vacant space is formed between the ribs 221 or between the grooves 222, as in the cells 215 in accordance with the former exemplary embodiment, and is filled with air. Since the empty spaces are formed, the intermediate panel 25 may have light weight as compared with the size thereof.

The intermediate panel 25 may have light weight and serve both to reinforce the display panel 10 and to minimize concentration of heat generated from the display panel 10 at a specific region, in the same manner as in the previous exemplary embodiment.

In general, the outer part 240 may include an aluminum sheet. On the other hand, the inner part 220 may include an aluminum plate.

The intermediate panel 25 includes the inner part 220 and the outer parts 240. The outer parts 240 may include two aluminum sheets disposed at a designated interval. The inner part 220 may include an aluminum plate.

In order to have the insulating function of the intermediate panel 25, the inner part 210 may be formed of plastic. In this case, the outer parts 240 may be formed of a material such as a nonwoven fabric.

As shown in FIG. 1 and FIGS. 4 to 10, the bracket 40 may be provided between the display panel 10 and the rear cover 60. The bracket 40 may be formed of aluminum having light weight and high durability.

Figure 4:
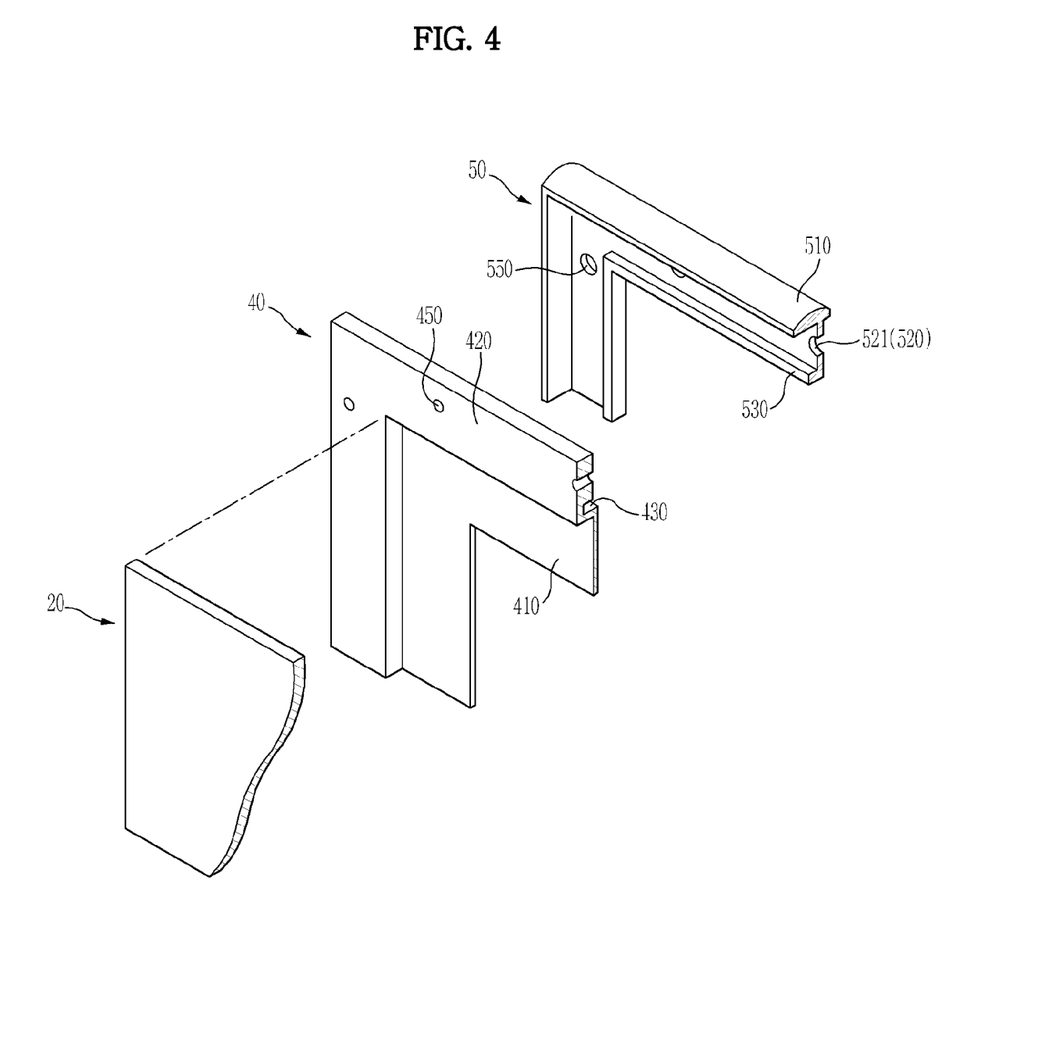
FIG. 4 is an enlarged view illustrating upper portions of an intermediate panel, a bracket and a side cover of FIG. 1.
Figure 5:
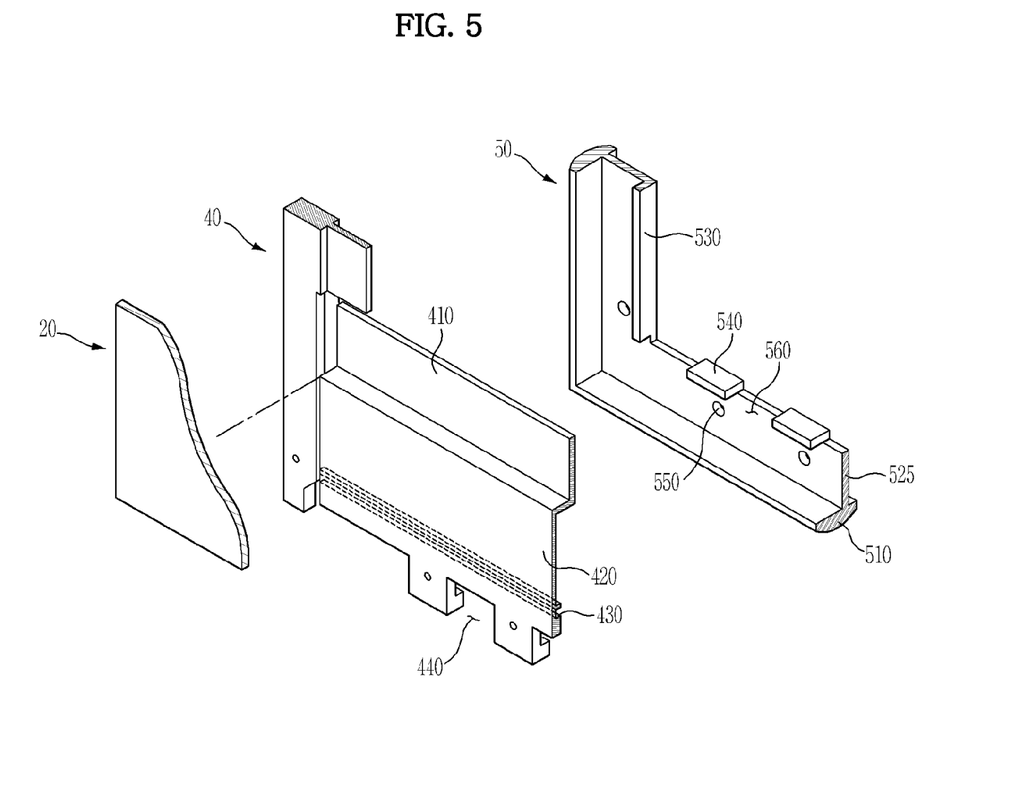
FIG. 5 is an enlarged view illustrating lower portions of the intermediate panel, the bracket and the side cover of FIG. 1.

The bracket 40 includes a second combining part 420 attached to the display panel 10, and a first combining part 410 attached to the intermediate panel 20. The second combining part 420 is attached to the display panel 10 at the outside of the side surface of the intermediate panel 20, and reinforces the edge of the display panel 10.

The second combining part 420 is provided to have the same shape as the edge of the display panel 10 or to protrude more outward than the edge of the display panel 10, in order to protect the edge of the display panel 10.

The first combining part 410 may be disposed between the intermediate panel 20 and the rear cover 60, and be attached to the rear surface of the intermediate panel 20.

The bracket 40 may be attached to the display panel 10 and the intermediate panel 20 through an adhesive element. The adhesive element may be a double-sided tape or an adhesive.

The bracket 40 may need to be attached both to the intermediate panel 20 and the display panel 10 through the rear portion of the display panel 10. Since the display panel 10 is disposed in front of the intermediate panel 20, a stepped structure is provided on the bracket 40 so that the second combining part 420 may protrude more forwardly, i.e., more frontally toward a front of the display panel, than the first combining part 410. The bracket 40 has such a stepped structure, and thus the intermediate panel 20 seated in the first combining part 410 is combined with the bracket 40.

The flexible printed circuit film 110 mounted at the lower end of the display panel 10 and the source printed circuit board 130 connected to the flexible printed circuit film 110 are connected to the main substrate 35 and the power substrate 31 disposed at the rear of the intermediate panel 20.

In order to connect the flexible printed circuit film 110 and the source printed circuit board 130 to the main substrate 35 and the power substrate 31, the flexible printed circuit film 110 and the source printed circuit board 130 need to pass through the bracket 40. Therefore, as shown in FIG. 8, at least one of first penetration parts 440 may be formed at the lower end of the bracket 40. The first penetration parts 440 may be formed by opening parts of the lower end of the bracket 40. Therefore, the remaining parts of the lower end of the bracket 40 except for the parts opened to form the first penetration parts 440 may have the shape of plural protrusions.

The flexible printed circuit film 110 passes through the first penetration parts 440 of the bracket 40 at the rear of the display panel 10, and is extended in the backward, i.e., rearward, direction of the bracket 40, toward a rear of the display device.

Since the first penetration parts 440 are formed at the lower end of the bracket 40, it is not ideal for the bracket 40 to form the external surface of the display device 1. Therefore, a side cover 50 protecting the side surface of the display device 1 is provided.

The side cover 50 includes a frame part 510 disposed at the outside of the side surfaces of the components from the display panel 10 to the rear cover 60 and forming the external appearance of the display device 1, and support parts 520 extending inward from the frame part 510. The frame part 510 may be configured to completely expose the front surface of the display panel 10, i.e., the frame part 510 may not cover the front surface of the display panel 10. The front surface region of the frame part 510 covers the side surface of the display panel 10 so as not to expose the side surface of the display panel 10, and the rear surface region of the frame part 510 covers the side surface of the rear cover 60 so as not to expose the side surface of the rear cover 60.

The side cover 50 may be one member in which respective sides of the frame part 510 are formed integrally. Otherwise, the side cover 50 may be formed by four or two separate members that are assembled into the frame part 510.

The support parts 520 may be formed at four sides of the frame part 510. The support parts 520 may include a first support part 521 extending inward from the upper portion of the frame part 510, and a second support part 525 extending inward from the lower portion of the frame part 510.

Figure 6:
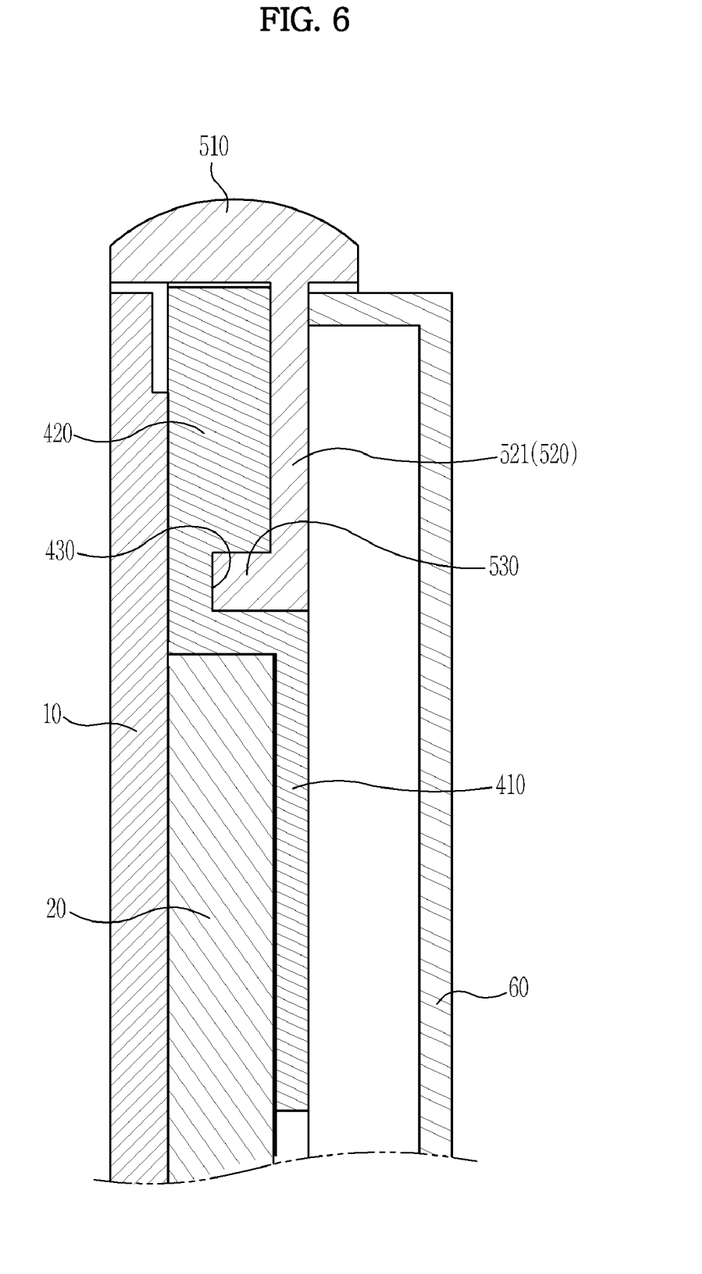
FIGS. 6 and 7 are cross-sectional views of an upper portion of the display device in accordance with an exemplary embodiment of the exemplary embodiments.
Figure 7:
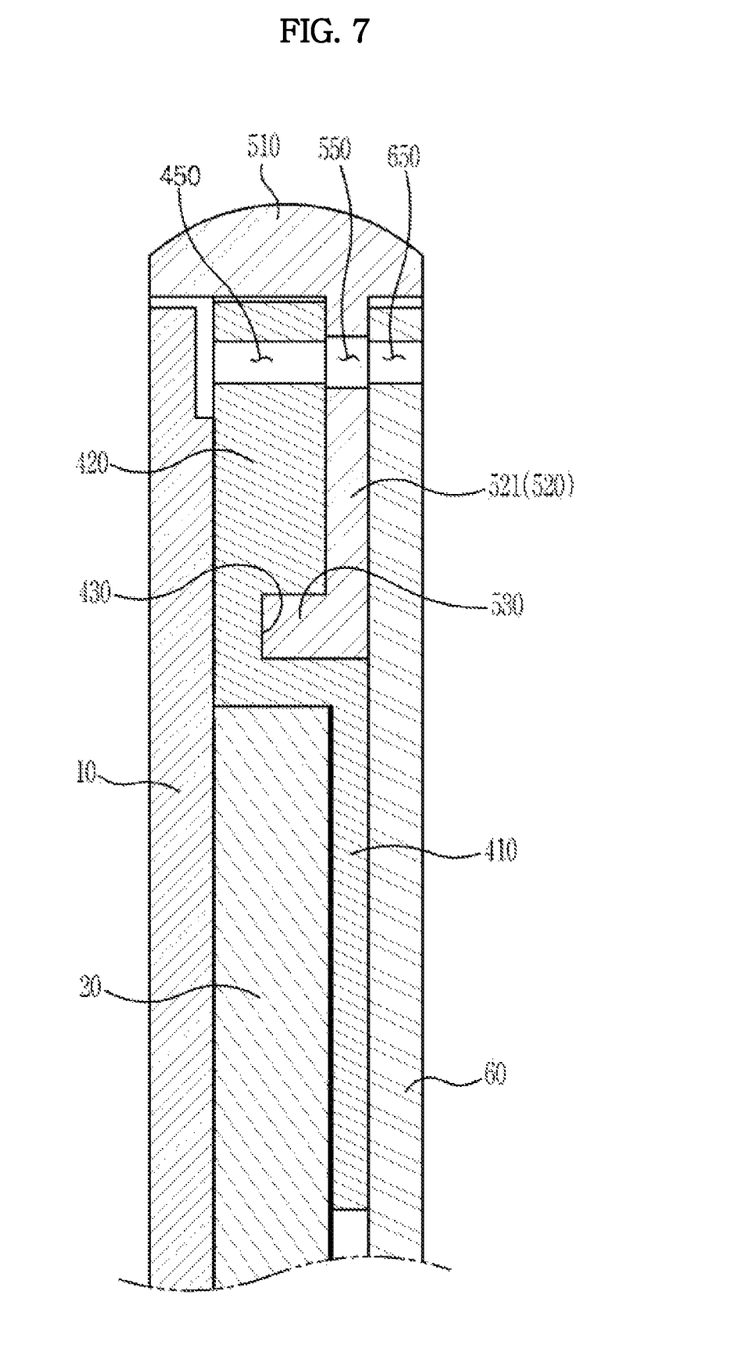

A portion of the second combining part 420 formed at the upper portion of the bracket 40 may be disposed between the display panel 10 and the first support part 521 of the side cover 50 and be combined with the first support part 521. A guide rib 530 bent forward, i.e., in the frontal direction, from the lower end of the first support part 521 may be formed. A guide groove 430 having a shape corresponding to the guide rib 530 may be formed on the second combining part 420 so that the guide rib 530 is inserted into the guide groove 430.

As shown in FIGS. 8 and 9, a portion of the second combining part 420 formed at the lower portion of the bracket 40 may be disposed between the display panel 10 and the second support part 525 of the side cover 50 and be combined with the second support part 525. FIG. 9 shows a plurality of guide protrusions 540 bent forward, i.e., in the frontal direction, from the upper end of the second support part 525 may be formed. A guide groove 430 into which the guide protrusions 540 are inserted may be formed on the second combining part 420.

Shown in FIG. 8 are penetration parts 560 which are formed between the plural guide protrusions 540. The second penetration parts 560 are formed at positions corresponding to the first penetration parts 440. Therefore, the flexible printed circuit film 110 passing through the first penetration parts 440 may be bent upward and pass through the second penetration parts 560. The source printed circuit board 130 mounted on the end of the flexible printed circuit film 110 passing through the second penetration part 560 is disposed at the rear of the second combining part 420.

Referring to FIGS. 4, 5 and 7, a plurality of first coupling holes 450 is formed on the second combining part 420 of the bracket 40, a plurality of second coupling holes 550 is formed on the support part 520 of the side cover 50, and a plurality of third coupling holes 650 is formed on the rear cover 60.

In accordance with this exemplary embodiment, the bracket 40 and the side cover 50 are first combined, and then the rear cover 60 is combined therewith. Therefore, the number of the first coupling holes 450 may be the same as the number of the second coupling holes 550, and the number of the third coupling holes 650 may be smaller than the number of the first coupling holes 450 and the number of the second coupling holes 550. The bracket 40 and the side cover 50 are coupled by inserting coupling members into some of the first coupling holes 450 and the second coupling holes 550. Thereafter, the rear cover 60 is coupled with the bracket 40 and the side cover 50 by inserting separate coupling members into the first coupling holes 450 and the second coupling holes 550 into which the former coupling members are not inserted, and the third coupling holes 650.

According to exemplary embodiment, the bracket 40, the side cover 50 and the rear cover 60 may be simultaneously combined. In this case, the number of the first coupling holes 450, the number of the second coupling holes 550 and the number of the third coupling holes 650 are the same.

During the coupling process of the bracket 40 and the side cover 50, the bracket 40 and the side cover 50 are first combined by inserting the guide rib 530 and the guide protrusions 540 into the guide grooves 430. The guide grooves 430, the guide rib 530 and the guide protrusions 540 serve to guide the bracket 40 and the side cover 50 so that they may be combined at the correct position.

The bracket 40 and the side cover 50 are secondarily combined by inserting the coupling members into the first coupling holes 450 and the second coupling holes 550 of the firstly combined bracket 40 and side cover 50.

The rear cover 60 may be formed of a material having high strength. The reason for this is that the rear cover 60 serves both to form the external appearance of the rear portion of the display device 1 and to protect the main substrate 35 and the power substrate 31 mounted on the intermediate panel 20. Further, the rear cover 60 functions to reduce breakage of the display device 1.

The rear cover 60 may have a shape, the central portion of which is gently protruded backward, i.e., rearward. In order to secure a space occupied by the main substrate 35 and the power substrate 31 disposed at the rear of the intermediate panel 20, only the portion of the rear cover 60 on which the main substrate 35 and the power substrate 31 are mounted may be protruded.

As is apparent from the above description, a display device in accordance with one exemplary embodiment of the exemplary embodiments includes an intermediate panel which may firmly support a display panel, maximize heat dissipation and have a light weight. Further, the intermediate panel may have an insulating function.

Further, the display device may facilitate assembly of the intermediate panel with other components, and protect the edge of the intermediate panel.

Although a few exemplary embodiments of the exemplary embodiments have been shown and described, it would be appreciated by those skilled in the art that changes may be made in these embodiments without departing from the principles and spirit of the invention, the scope of which is defined in the claims and their equivalents.

What is claimed is:

1. A display device comprising:
a display panel disposed at a front of the display device;
a support disposed at a rear of the display panel to support the display panel;
a frame comprising a frame part disposed at an outer portion of the display panel and supporting parts extended from the frame part to be disposed at the rear of the display panel and coupling with the display panel; and
a rear cover disposed at a rear surface of the support and the rear cover forming an external appearance of a rear surface of the display device,
wherein the support comprises:
an intermediate panel disposed on the rear of the display panel to reinforce the display panel and to minimize concentration of heat generated from the display panel; and
a bracket disposed between the intermediate panel and the rear cover,
wherein the bracket comprises:
a first combining part attached to the intermediate panel; and
a second combining part configured to attach to the display panel, and
wherein the bracket further comprises guide grooves disposed on a rear surface of the second combining part.

2. The display device according to claim 1, wherein the supporting parts are coupled to the display panel by an adhesive.

3. The display device according to claim 1, wherein the supporting parts are coupled to the display panel by double-sided tape.

4. The display device according to claim 1, wherein the supporting parts are coupled to the display panel though the bracket.

5. The display device according to claim 1, wherein the intermediate panel comprises:
an inner part; and
at least one outer part mounted on at least one of a front surface and a rear surface of the inner part.

6. The display device according to claim 5, wherein the inner part is formed of a plastic plate.

7. The display device according to claim 6, wherein the at least one outer part is foamed of aluminum.

8. The display device according to claim 5, wherein the inner part comprises a plurality of cells.

9. The display device according to claim 8, wherein each of the plurality of cells has a hexagonal shape.

10. The display device according to claim 5, wherein the inner part has a honey comb structure.

11. The display device according to claim 5, wherein the inner part comprises a wave-shaped corrugated structure.

12. The display device according to claim 5, wherein at least one of the inner part and the at least one outer part comprises an insulator formed of plastic.

13. The display device according to claim 1, wherein the frame further comprises a guide rib protruding in the frontal direction from the supporting parts, which are received in one of the guide grooves.

14. The display device according to claim 1, wherein the supporting parts of the frame comprise a first supporting part provided at an upper end of the frame and a second supporting part provided at a lower end of the frame.

15. The display device according to claim 1, wherein the second combining part protrudes toward a frontal direction from the first combining part.

16. The display device according to claim 1, wherein the intermediate panel has a light weight.

17. The display device comprising:
   a display panel disposed at a front of the display device;
   an intermediate panel disposed at a rear of the display panel to reinforce the display panel and to minimize concentration of heat generated from the display panel;
   a frame comprising a frame part disposed at an outer portion of the display panel and supporting parts extended from the frame part to be disposed at the rear of the display panel and coupling the display panel;
   at least one circuit board disposed at a rear surface of the intermediate panel;
   a rear cover disposed at the rear of the display panel and covering the at least one circuit board; and
   a bracket disposed between the intermediate panel and the rear cover,
   wherein the bracket comprises;
      a first combining part attached to the intermediate panel; and
      a second combining part configured to attach to the display panel, and
      wherein the bracket comprises guide grooves disposed on a rear surface of the second combining part.

18. The display device according to claim 17, wherein the at least one circuit board comprises a first substrate generating an image signal displayed on the display panel.

19. The display device according to claim 17, wherein the at least one circuit board comprises a second substrate connecting the display device to an external power supply.

20. The display device according to claim 17, wherein the supporting parts are coupled to the display panel by an adhesive.

21. The display device according to claim 17, wherein the supporting parts are coupled to the display panel by a double-sided tape.

22. The display device according to claim 17, wherein the supporting part is coupled to the display panel though the bracket.

23. The display device according to claim 17, further comprising a holder combined with the rear surface of the intermediate panel, and
   wherein the at least one circuit board is seated on the holder.

24. The display device according to claim 17, wherein the intermediate panel comprises:
   an inner part; and
   at least one outer part mounted on at least one of a front surface and a rear surface of the inner part.

25. The display device according to claim 24, wherein the inner part is formed of a plastic plate.

26. The display device according to claim 24, wherein the inner part comprises a plurality of cells, and each of the plurality of cells has a hexagonal shape.

27. The display device according to claim 24, wherein the inner part has a honey comb structure.

28. The display device according to claim 24, wherein the inner part has a wave-shaped corrugated structure.

29. The display device according to claim 24, wherein at least one of the inner part and the at least one outer part includes an insulator formed of plastic.

30. The display device according to claim 17, wherein the second combining part protrudes toward a frontal direction from the first combining part.

31. The display device according to claim 17, wherein the intermediate panel has light weight.

* * * * *